(12) United States Patent
Kochavi

(10) Patent No.: US 11,439,267 B2
(45) Date of Patent: Sep. 13, 2022

(54) BEVERAGE MAKER

(71) Applicant: Ofer Kochavi, Tzurit (IL)

(72) Inventor: Ofer Kochavi, Tzurit (IL)

( * ) Notice: Subject to any disclaimer, the term of this patent is extended or adjusted under 35 U.S.C. 154(b) by 0 days.

(21) Appl. No.: 17/499,503

(22) Filed: Oct. 12, 2021

(65) Prior Publication Data

US 2022/0110472 A1 Apr. 14, 2022

(30) Foreign Application Priority Data

Oct. 11, 2020 (IL) .......................................... 277952

(51) Int. Cl.
| | | |
|---|---|---|
| *A47J 31/00* | (2006.01) | |
| *A47J 31/52* | (2006.01) | |
| *A47J 31/40* | (2006.01) | |
| *A47J 31/56* | (2006.01) | |
| *A47J 43/044* | (2006.01) | |
| *B60N 3/10* | (2006.01) | |
| *B65D 85/804* | (2006.01) | |
| *H05B 1/02* | (2006.01) | |

(52) U.S. Cl.
CPC ........... *A47J 31/005* (2013.01); *A47J 31/407* (2013.01); *A47J 31/5253* (2018.08); *A47J 31/56* (2013.01); *A47J 43/044* (2013.01); *B60N 3/104* (2013.01); *B65D 85/804* (2013.01); *H05B 1/0269* (2013.01); *A47J 2202/00* (2013.01); *H05B 2213/05* (2013.01); *H05B 2213/07* (2013.01)

(58) Field of Classification Search
CPC .... A47J 31/005; A47J 31/5253; B65D 85/804
See application file for complete search history.

(56) References Cited

U.S. PATENT DOCUMENTS

| 2004/0149139 A1 | 8/2004 | Kollep ........................... 99/279 |
| 2005/0103771 A1* | 5/2005 | Vu ............................. F23Q 7/24 |
| | | 219/270 |

(Continued)

FOREIGN PATENT DOCUMENTS

| CN | 204071764 U | 1/2015 |
| CN | 107485287 A | 12/2017 |

(Continued)

OTHER PUBLICATIONS

Israel Office Action dated Feb. 4, 2021, issued to corresponding Israel Application No. 277952.

(Continued)

*Primary Examiner* — John J Norton
(74) *Attorney, Agent, or Firm* — Stein IP, LLC

(57) ABSTRACT

A method for operating a drink maker within a vehicle. The method includes placing a cup on a seating associated with a heating mechanism, the cup containing a liquid and an essence, wherein the liquid and the essence are separated by a ring-shaped partition, automatically sensing a presence of the cup on the seating, turning on a heating mechanism for warming the liquid, sensing a temperature relating to the temperature of the liquid, and turning off the heating mechanism upon sensing a first predetermined temperature, mixing the liquid and the essence and inserting a stirrer through the ring upon warming to a second predetermined temperature lower than the first predetermined temperature, stirring the liquid with the stirrer, and removing the cup from said seating.

20 Claims, 7 Drawing Sheets

(56) References Cited

U.S. PATENT DOCUMENTS

| | | | | |
|---|---|---|---|---|
| 2005/0252382 | A1* | 11/2005 | Gamez Duch | A47J 31/005 99/279 |
| 2010/0098823 | A1 | 4/2010 | Nenov et al. | 426/433 |
| 2013/0312617 | A1* | 11/2013 | Toporovsky | A47J 31/005 99/280 |
| 2015/0223632 | A1* | 8/2015 | Hall | A47J 31/44 99/295 |
| 2018/0139979 | A1* | 5/2018 | Glynn | A23F 5/26 |
| 2020/0288899 | A1 | 9/2020 | Abu-Saymeh et al. | |

FOREIGN PATENT DOCUMENTS

| | | | | |
|---|---|---|---|---|
| DE | 2835814 A1 | 2/1980 | | |
| EP | 2939576 A1 | 11/2015 | | |
| EP | 3569113 A1 | 11/2019 | | |
| GB | 2374274 A | * 10/2002 | | A47J 31/005 |
| KR | 2006027953 A | * 3/2006 | | A47G 19/16 |
| KR | 2010026577 A | * 3/2010 | | |
| WO | WO 2004/073468 A1 | 9/2004 | | |
| WO | WO-2012004430 A1 | * 1/2012 | | A47J 31/36 |

OTHER PUBLICATIONS

Israel Notice of Allowance dated Aug. 23, 2021, issued to corresponding Israel Application No. 277952.

* cited by examiner

BEVERAGE MAKER

CROSS-REFERENCE TO RELATED APPLICATIONS

This application claims the benefit of Israeli Application No. 277952, filed Oct. 11, 2020, in the Israel Patent Office. All disclosures of the document named above are incorporated herein by reference.

BACKGROUND OF THE INVENTION

Field of the Invention

The invention is in the field of vehicle accessories and in the field of coffee makers, especially mobile coffee makers.

BACKGROUND

Usually, a vehicle driver consumes hot beverages like coffee, tea or soup at gas stations or convenience stores. However, quite often such stopping points are sparse and/or require lengthy stops the driver cannot afford, and a driver wants some hot drink in between stops. Moreover, a driver may be interested in saving money and produce his/her own beverage.

The prior art includes several mobile coffee makers for addressing the above need. US application no. 2004149139 suggests "an espresso coffee designed for a low-voltage vehicle that includes a water tank connected to a pump for pumping the water to a heating element which is itself connected to a brewing head in which a cartridge of coffee is brewed, a moveable closure for dosing the head with a mechanism for moving the closure from an open position to a dosed position and vice versa, a coffee dispensing pipe associated with the closure and a connection for the electric power supply, in which machine the heating of the heating element is switched off or reduced when the pump is running".

US application No. 2010098823A1 suggests "a method of making espresso and a portable espresso machine incorporating that method that is compact, lightweight, requires low power, and is readily transportable. The quantity of water required to make espresso is heated to the brewing temperature in a boiler equipped with a piston. The piston is driven by an electric motor. During the brewing cycle, the hot water is pushed by the piston through the compacted coffee contained in the portafilter. The rate of piston movement is chosen such that the coffee in the portafilter is infused by the hot water at the high pressure necessary for making espresso, typically about 100 psi or higher, and also such that the contact between the coffee and water is of a duration suitable for making espresso, typically about 15-25 seconds. The components are thermally insulated and strategically placed to minimize the size of the machine and allow for portability."

These machines, and other machines offered in the prior art are quite complex machines that boil water and apply pressurized boiled water to an essence. The user has to use two hands to operate the machine and to initially prepare the water and essence on special chambers. The machines are bulky which is a problem when they are situated next to a driver. Thus, there is a need for a simpler hot beverage maker that may be operated in a vehicle by a single hand and necessitates less preparations from the driver.

BRIEF SUMMARY OF THE INVENTION

A method for operating a beverage maker within a vehicle using a single hand is disclosed hereinbelow. The method includes placing a cup on a seating associated with a heating mechanism, the placed cup containing a liquid and an essence, automatically sensing a presence of the placed cup on the seating, automatically turning on the heating mechanism for warming the liquid, and automatically sensing a temperature relating to the temperature of the liquid. The method further includes the steps of automatically turning off the heating mechanism upon sensing a desired drinking temperature, and removing the placed cup from the seating.

In some embodiments, the method applies no pressurized liquid and no pressurized liquid vapor on the essence.

In some embodiments, the method includes a step of operationally associating the beverage maker with an electrically powered vehicle part. Preferably, a power cord is connected to a cigarette lighter socket.

In some embodiments, the method includes a step of fixedly attaching the beverage maker to an internal vehicle part.

In some embodiments, the method includes a step of automatically issuing an alarming signal that the liquid is at a desired drinking temperature.

In some embodiments, the method includes a step of slightly shaking the cup for better mixing of the liquid and the essence.

In some embodiments, the placed cup is a dedicated cup wherein the liquid and the essence are separated by a partition, the partition enables mixing of the liquid and the essence upon warming to an intermediate temperature, lower than the desired drinking temperature. Preferably, the partition includes a solid edible material which melts or dissolves upon warming to the intermediate temperature. Most preferably, the partition includes sheets perforated by holes blocked by the solid edible material.

A disposable drinking kit is disclosed which includes a disposable cup, an internal partition for defining a first volume and a second volume within the disposable cup, a liquid within the first volume and an essence within the second volume. The disposable cup includes a thermally conducting bottom, a thermally insulating barrel, and a cup cover. The partition allows mixing of the liquid and the essence upon warming the liquid to a desired drinking temperature.

In some embodiments, the thermally conducting bottom includes an aluminum foil and the thermally insulating barrel includes paper, polystyrene, wood, cork, cellulose, and mixtures thereof.

In some embodiments, a connection between the thermally conducting bottom and the thermally insulating barrel is resistant to heat exerted upon the disposable cup while warming it to a desired drinking temperature.

A beverage maker for a vehicle is disclosed which includes a seating associated with a heating mechanism, the seating receives the disposable cup, and the heating mechanism warms up the liquid upon placing the disposable cup on the seating. It also includes a cup presence sensor for issuing a signal upon placing the disposable cup on the seating, a cup temperature sensor for issuing signals relating to the temperature of the liquid, an alarm for issuing an alarming signal upon terminating operation of the heating mechanism, and an electrical controller. The controller receives the placing signal, turns on the heating mechanism, receives temperature signals, terminates heating mechanism operation, and turns on the alarm.

In some embodiments, the alarm is an acoustic alarm and/or a flashing alarm.

In some embodiments, the beverage maker is connected to an electrically powered vehicle part and includes a plug-socket interface for matching electrical parameters provided by the electrically powered vehicle part and electrical parameters desired for the heating mechanism. Preferably, the beverage maker includes a power cord for connection to a cigarette lighter socket. Alternatively, the beverage maker directly plugs into the cigarette lighter socket.

In some embodiments, the beverage maker includes a cigarette lighter plug and/or a USB socket for providing electrical power to a device.

In some embodiments, the heating mechanism includes two first electrically conductive elements that are electrically isolated from each other. The disposable cup is heated by the two first electrically conductive elements upon application of an electrical contact closing a heating electrical circuit. Preferably, the disposable cup includes two second electrically conductive elements as well. The seating receives the disposable cup, such as to allow the cup bottom to be heated by the at least two second electrically conductive elements when they come into electrical contact with the two first electrically conductive elements.

According to another aspect a method for operating a drink maker within a vehicle using a single hand, is provided, the method comprising:
a. providing a stirrer;
b. placing a cup on a seating associated with a heating mechanism, said placed cup containing a liquid and an essence, wherein the liquid and the essence are separated by a ring-shaped partition;
c. automatically sensing a presence of the placed cup on said seating;
d. automatically turning on a heating mechanism for warming said liquid;
e. automatically sensing a temperature relating to the temperature of said liquid;
f. automatically turning off said heating mechanism upon sensing a first predetermined temperature;
g. said partition enabling mixing of said liquid and said essence upon warming to a second predetermined temperature, said second predetermined temperature is lower than said first predetermined temperature;
h. inserting said stirrer through the ring when the liquid is at the second predetermined temperature;
i. stirring the liquid with said stirrer, and
j. removing said placed cup from said seating.

Optionally, the method applies no pressurized liquid and no pressurized liquid vapor on said essence.

In some embodiments the method further comprises a step of operationally associating said drink maker to an electrically powered vehicle part.

In some embodiments the method further comprises a step of connecting a power cord to a cigarette socket of the vehicle.

In some embodiments the method further comprises a step of fixedly attaching said drink maker to an internal car part.

In some embodiments the method further comprises a step of removing a cover off said placed cup.

In some embodiments the method further comprises a step of automatically issuing an alarm that the liquid is at said first predetermined temperature.

In some embodiments said partition includes a solid edible material which melts or dissolves upon warming to said second predetermined temperature.

In some embodiments the method further comprises said partition includes at least one sheet perforated by a plurality of holes blocked by said solid edible material.

In some embodiments the cup includes a thermally conducting bottom, a thermally insulating barrel and a cup cover.

In some embodiments said thermally conducting bottom includes an aluminum foil.

In some embodiments said thermally insulating barrel includes a material selected from a list of materials consisting paper, polystyrene, wood, cork, cellulose, and mixtures thereof.

In some embodiments a connection between said thermally conducting bottom and said thermally insulating barrel withstands heat exerted upon the disposable cup while warming it to a second predetermined temperature.

In some embodiments said partition is perforated by a plurality of holes blocked by said edible material.

In some embodiments the method comprises:
further providing a seating associated with a heating mechanism, said seating configured for receiving said cup, and said heating mechanism warming up said liquid upon placing said disposable cup on said seating;
further providing a cup presence sensor and issuing a first signal upon placing said disposable cup on said seating;
further providing a cup temperature sensor, and issuing a plurality of second signals relating to the temperature of said liquid;
further providing an alarm and issuing an alarming signal upon terminating operation of said heating mechanism; and
further providing an electrical controller and receiving said first signal, for turning on said heating mechanism, for receiving said plurality of second signals, for terminating heating mechanism operation, and for turning on said alarm.

Some embodiments further comprise sounding an acoustic alarm and/or a flashing alarm.

Some embodiments further comprise providing means for connection to an electrically powered vehicle part, and a plug-socket interface for matching electrical parameters provided by said electrically powered vehicle part and electrical parameters desired for said heating mechanism.

In some embodiments said heating mechanism comprises at least two first electrically conductive elements that are electrically isolated from each other, and heating the cup by said at least two first electrically conductive elements upon application of an electrical contact closing a heating electrical circuit.

In some embodiments said disposable cup comprises at least two second electrically conductive elements, and said seating is configured to receive said disposable cup, and allowing the cup bottom to be heated by said at least two second electrically conductive elements when they come into electrical contact with the at least two first electrically conductive elements.

Some embodiments further comprise further comprising a step of connecting a power cord to a cigarette socket of the vehicle.

BRIEF DESCRIPTION OF THE DRAWINGS

The subject matter regarded as the invention is particularly pointed out and distinctly claimed in the concluding portion of the specification. The invention, however, both as to system organization and method of operation, together with features and advantages thereof, may best be understood by reference to the following detailed description when read with the accompanied drawings in which:

DETAILED DESCRIPTION OF THE INVENTION

Figure 1A:
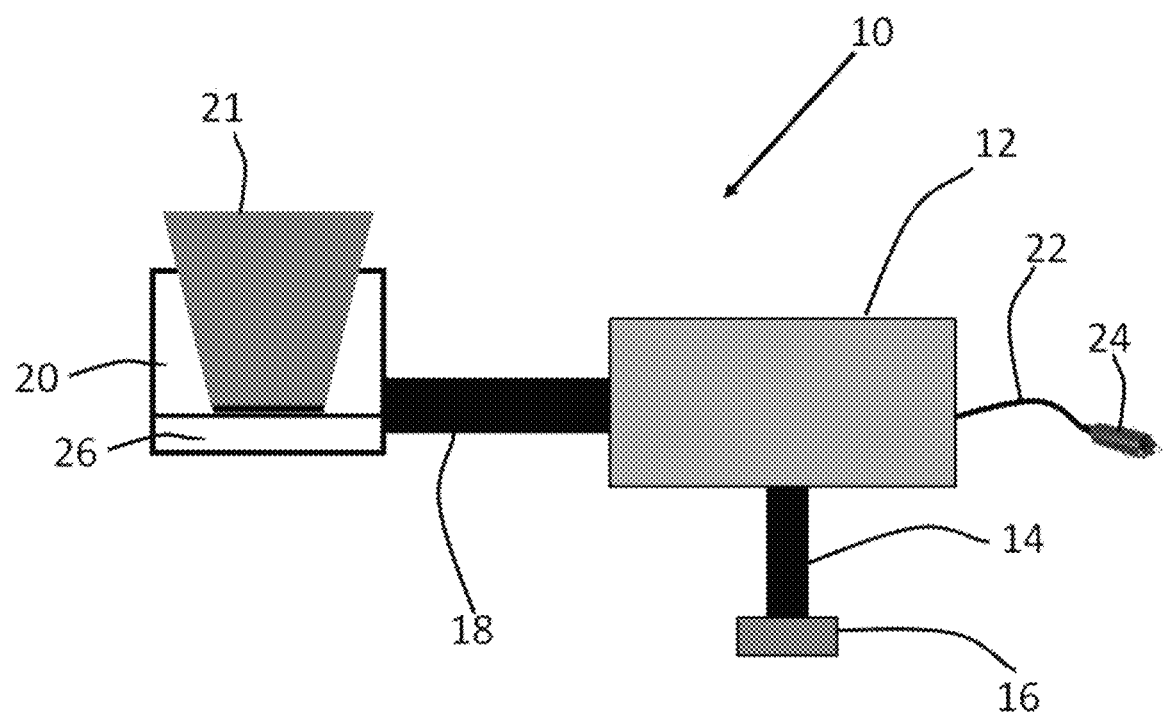
FIG. 1a is a side view of a beverage maker with a disposable cup therein.

The present invention will now be described in terms of specific example embodiments. It is to be understood that the invention is not limited to the example embodiments disclosed. It should also be understood that not every feature of the methods and systems handling the beverage maker is necessary to implement the invention as claimed in any particular claim of the appended claims. Various elements and features of devices are described to fully enable the invention. It should also be understood that throughout this disclosure, where a method is shown or described, the steps of the method may be performed in any order or simultaneously, unless it is clear from the context that one step depends on another being performed first.

Before explaining several embodiments of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as commonly understood by one of ordinary skill in the art to which this invention belongs. The systems, methods, and examples provided herein are illustrative only and not intended to be limiting.

In the description and claims of the present application, each of the verbs "comprise", "include" and "have", and conjugates thereof, are used to indicate that the object or objects of the verb are not necessarily a complete listing of members, components, elements or parts of the subject or subjects of the verb.

A beverage maker embodiment (FIGS. 1a, 1b and 2) A beverage or drink maker 10 for a vehicle is described in the following section. The spatial and mechanical features are schematically illustrated in FIG. 1a (side view) and FIG. 1b (view from above) while the electrical wiring is schematically illustrated in the block diagram of FIG. 2. The exemplary beverage maker 10 of FIGS. 1a and b includes a base 12 connected fixedly by a rod 14 to an internal vehicle part 16. The base 12 is connected by a bar or a rod 18 to a cup seating 20, for hosting a disposable cup 21. The base 12 is connected by a power cord 22 having a cigarette lighter plug 24, to a cigarette lighter socket 28 (FIG. 2) of the vehicle.

Figure 1B:
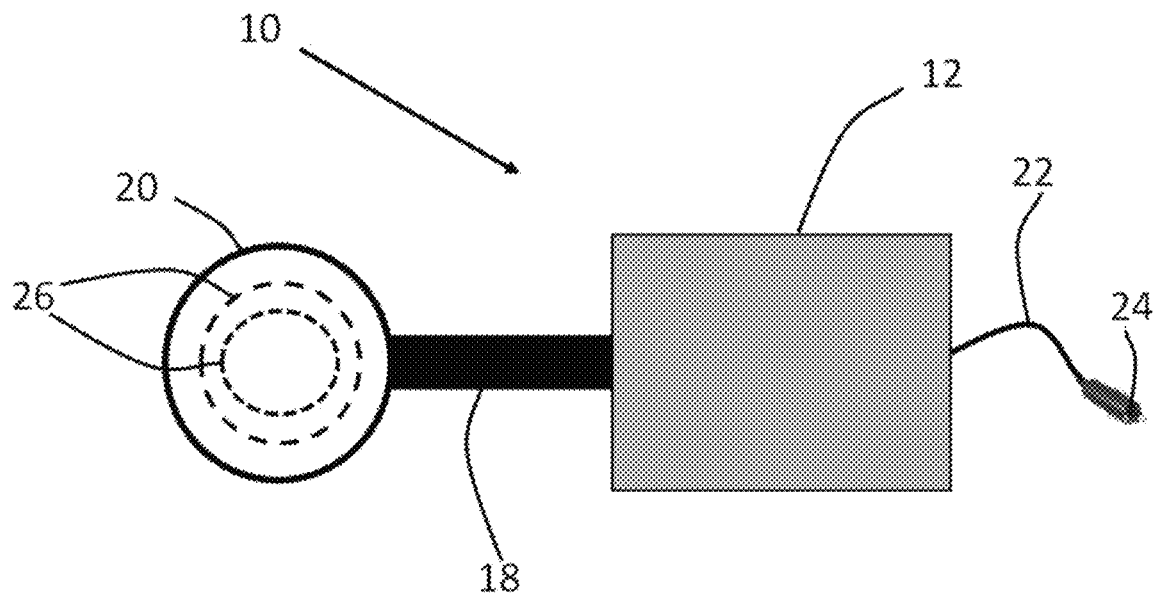
FIG. 1b is a top view of the beverage maker of FIG. 1 without the disposable cup.

In the exemplary embodiment of FIG. 1b, two circular resistors 26, residing on the bottom of the cup seating 20 are used to warm up a liquid within the disposable cup 21.

Figure 2:
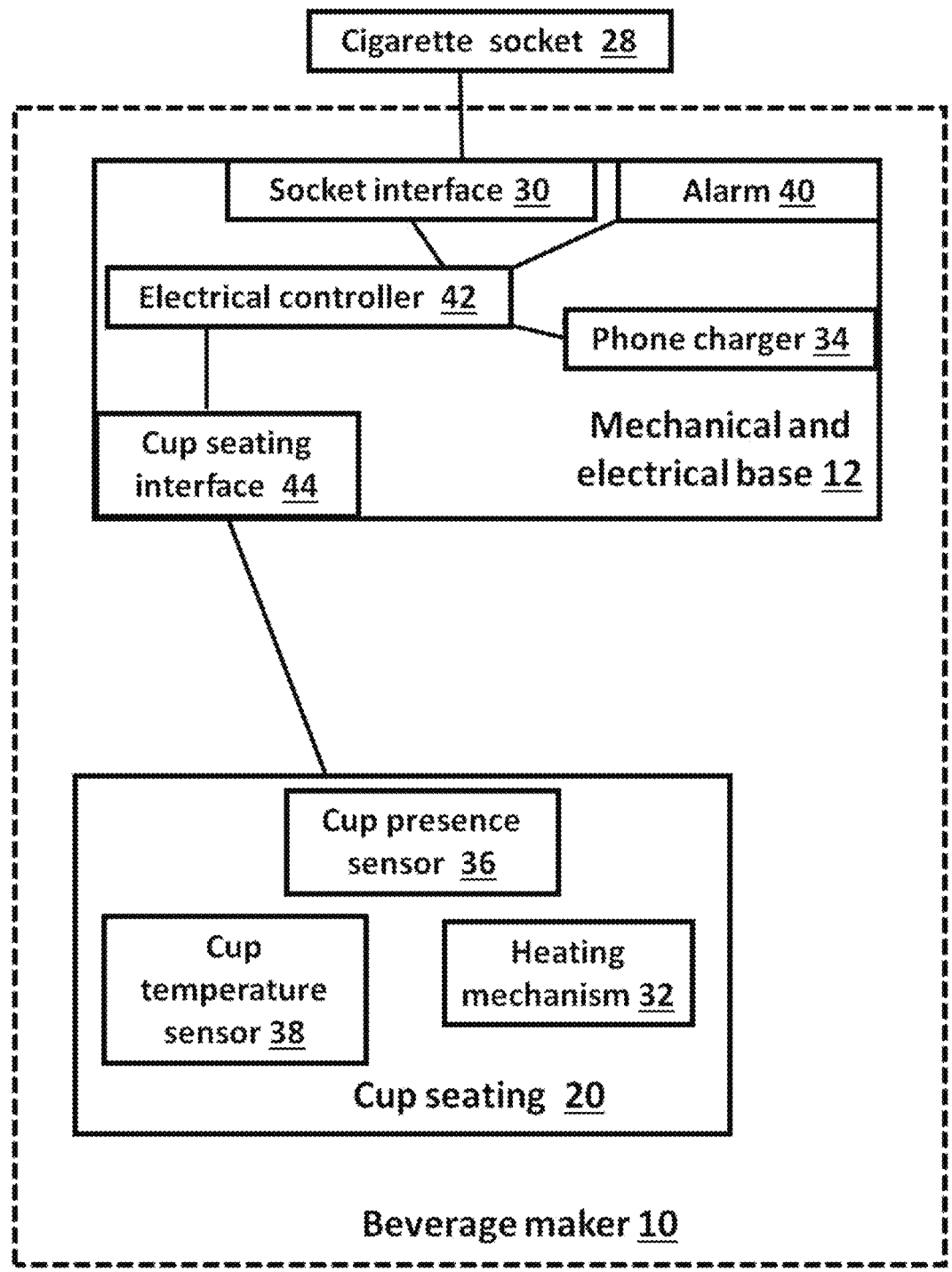
FIG. 2 is an electrical block diagram of an exemplary beverage maker.

Turning now to FIG. 2, base 12 is connected to a cigarette socket 28 of the vehicle and includes a plug-socket interface 30 for matching electrical parameters provided by the cigarette socket 28 and electrical parameters desired for heating mechanism 32. The heating mechanism may need an operating voltage which is different from the 12-volt or 24-volt battery of the vehicle. Preferably, the beverage maker 10 includes a power cord 22 (FIG. 1b) for connecting the base 12 to a cigarette lighter socket 28. Alternatively, the beverage maker 10 plugs directly into the cigarette lighter socket 28.

The beverage maker 10 may include a charger 34 having a cigarette lighter socket and/or a USB socket for providing electrical power to a device (not shown).

For example, the beverage maker 10 may include a charger 34 for charging a mobile phone (not shown) via a USB connection (not shown).

The cup seating 20 includes a cup presence sensor 36 for issuing a signal upon placing the disposable cup 21 on the seating, and a cup temperature sensor 38 for issuing signals relating to the temperature of the liquid.

The base 12 includes an electrical controller 42, and an alarm 40 for issuing an alarming signal upon terminating operation of the heating mechanism 32 in accordance with signals issued by temperature sensor 38. The controller 42 receives a cup placing signal, turns on the heating mechanism 32, receives temperature signals, terminates operation of heating mechanism 32, and turns on the alarm 40. The alarm 40 is an acoustic alarm and/or a flashing alarm.

Base 12 may include a cup seating interface 44 for interfacing the cup seating 20.

Preferably, beverage maker 10 includes no machinery for applying pressurized liquid and/or pressurized liquid vapor on the contents of the cup 21. Namely, the beverage maker 10 is able to prepare certain beverages like coffee, tea, and soup even though it falls short of the capability to apply pressurized fluid on contents of cup 21.

In some embodiments the beverage maker 10 weighs less than 750 grams, preferably less than 500 grams. Its volume is less than 1000 ml, preferably less than 500 ml.

Figure 3A:
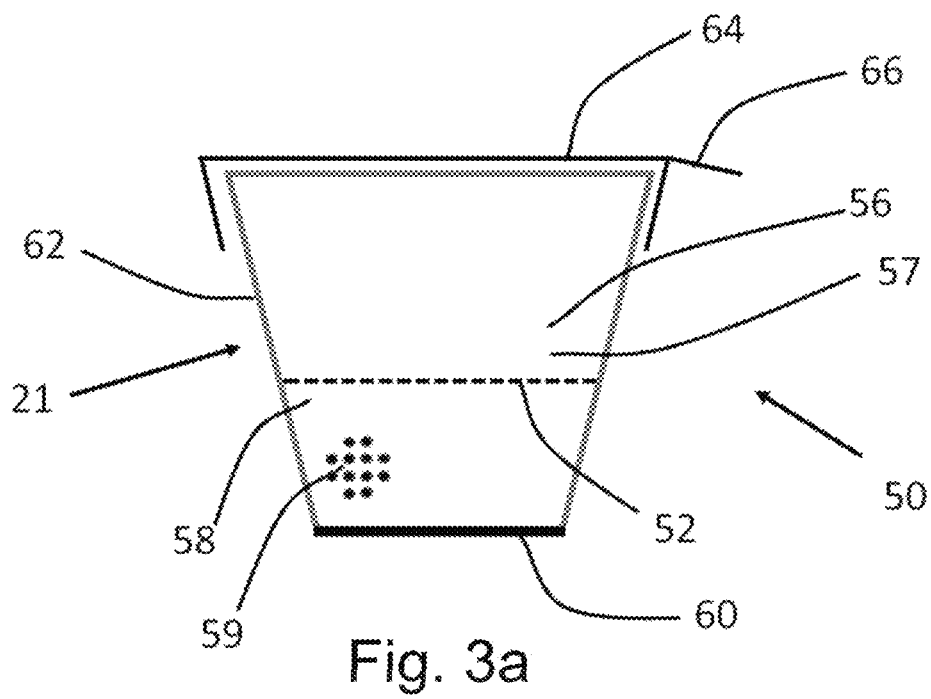
FIG. 3a is a side view of an open disposable cup showing a partition for defining a first volume and a second volume.
Figure 3B:
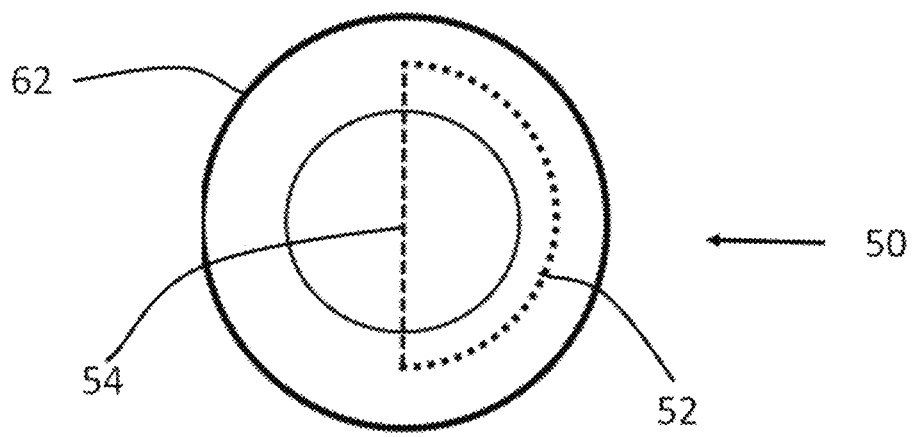
FIG. 3b is a top view of a closed disposable cup.
Figure 3C:
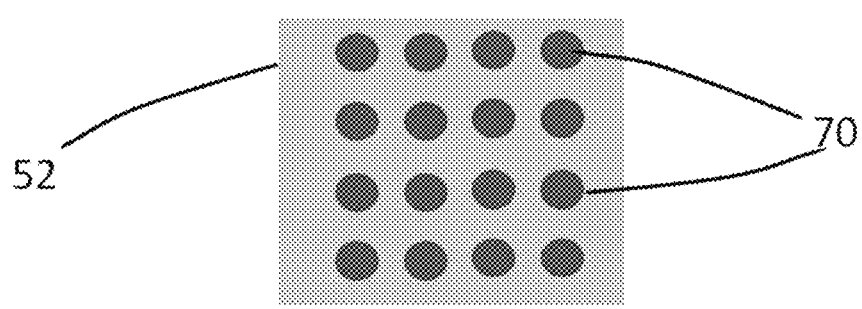
FIG. 3c is an exemplary sheet used in the partition.

A disposable cup embodiment (FIGS. 3a, 3b, 3c, 5a and 5b) The disposable cup 21 of FIGS. 1a (side view) and 1b (view from above) is a part of a disposable drinking kit 50 illustrated schematically in FIGS. 3a, 3b and 3c. The kit 50 includes at least one disposable cup 21, each cup 21 having an internal partition 52 for defining a first volume 56 and a second volume 58 within the disposable cup 21, a liquid 57 within the first volume 56 and an essence 59 within the second volume 58. The disposable cup 21 includes a thermally conducting bottom 60, a thermally insulating barrel 62, and a cup cover 64, which may include a flap 66 to assist cover removal before or after heating, as desired. The top part of the barrel 62 is configured to match lip contact in respect of softness, low heat transfer, and surface quality.

The partition 52 allows mixing of the liquid 57 and the essence 59 upon warming the liquid 57 to a higher temperature as detailed below. As shown in the top view of FIG. 3b, partition 52 may include a portion essentially parallel to the cup bottom 60 and a portion 54 essentially vertical to the cup bottom 60, thus enabling direct contact of the thermally conducting bottom 60 with liquid 59. The vertical partition 54 may facilitate limiting the volume 58 allocated to the essence 59 and may enable direct contact of the liquid 57 with a thermally conducting bottom 60. In some embodiments, only a vertical partition is used, for example when the essence contains particulate insoluble matter such as tea leaves. In some embodiments only a horizonal partition is used.

In some embodiments (not shown) the partition that contains the essence is in contact or proximal to the cup bottom. Such embodiments may require heating the essence to a high temperature and with a high amount of heat, such as unsweetened cocoa powder. Other embodiments have the partition distal to the bottom, such as in embodiments wherein the essence is heat-sensitive, and the heating of the essence is by heat-transfer from the liquid to the essence. Such partitions may be in the general shape of a cage hanging from a lip of the cup or a cover of the cup, or a compartment attached to the interior wall of the cup, in any case the partition allows transport of the liquid from under the partition to above the partition so that essentially the entire liquid contents of the cup can be consumed.

Figure 6A:
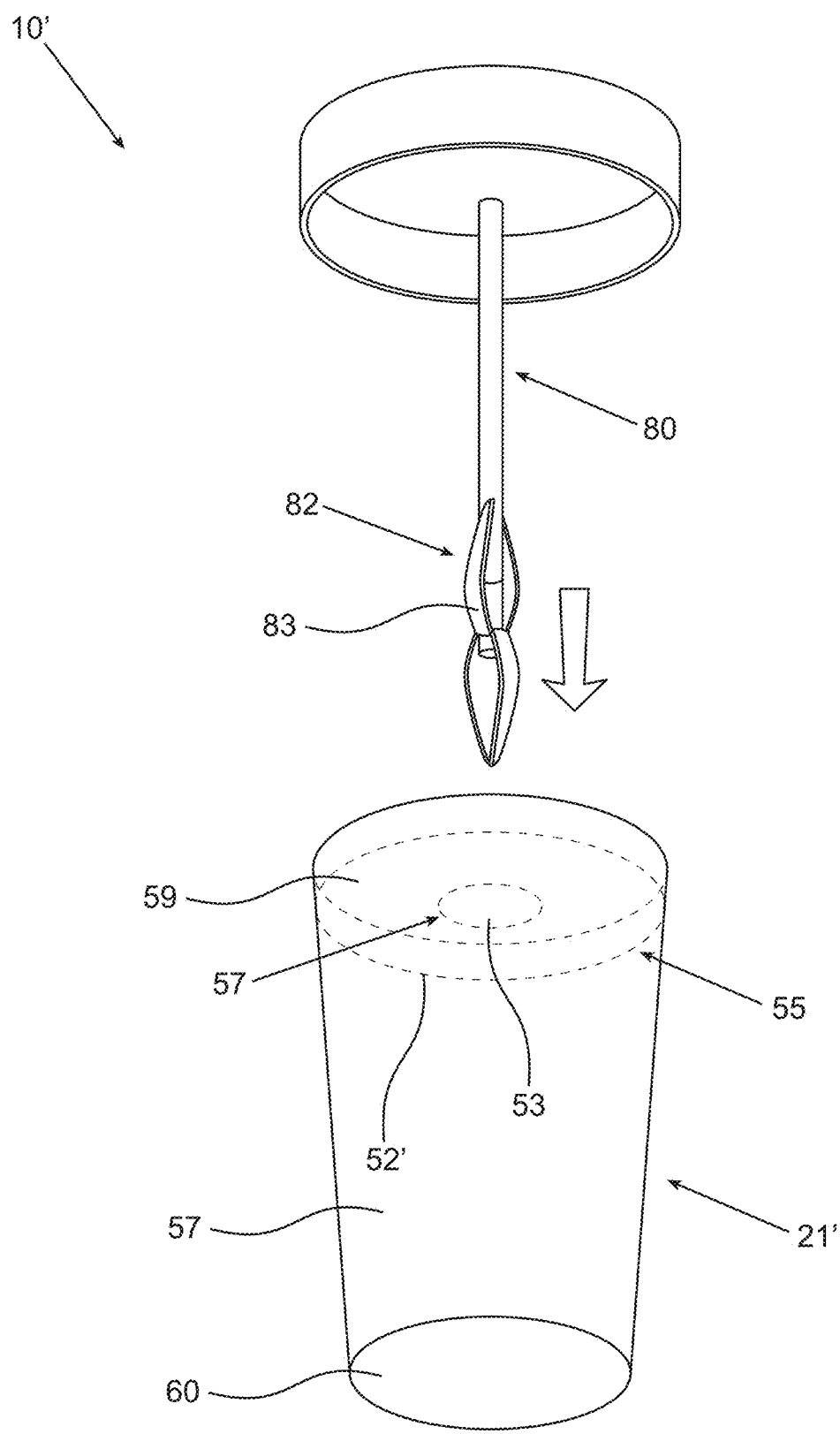
FIG. 6a shows an embodiment wherein the partition is ring-shaped, such that a stirrer may be inserted through a hole in the ring and into the cup to stir the liquid and/or help break up particulate soluble matter in the essence.
Figure 6B:
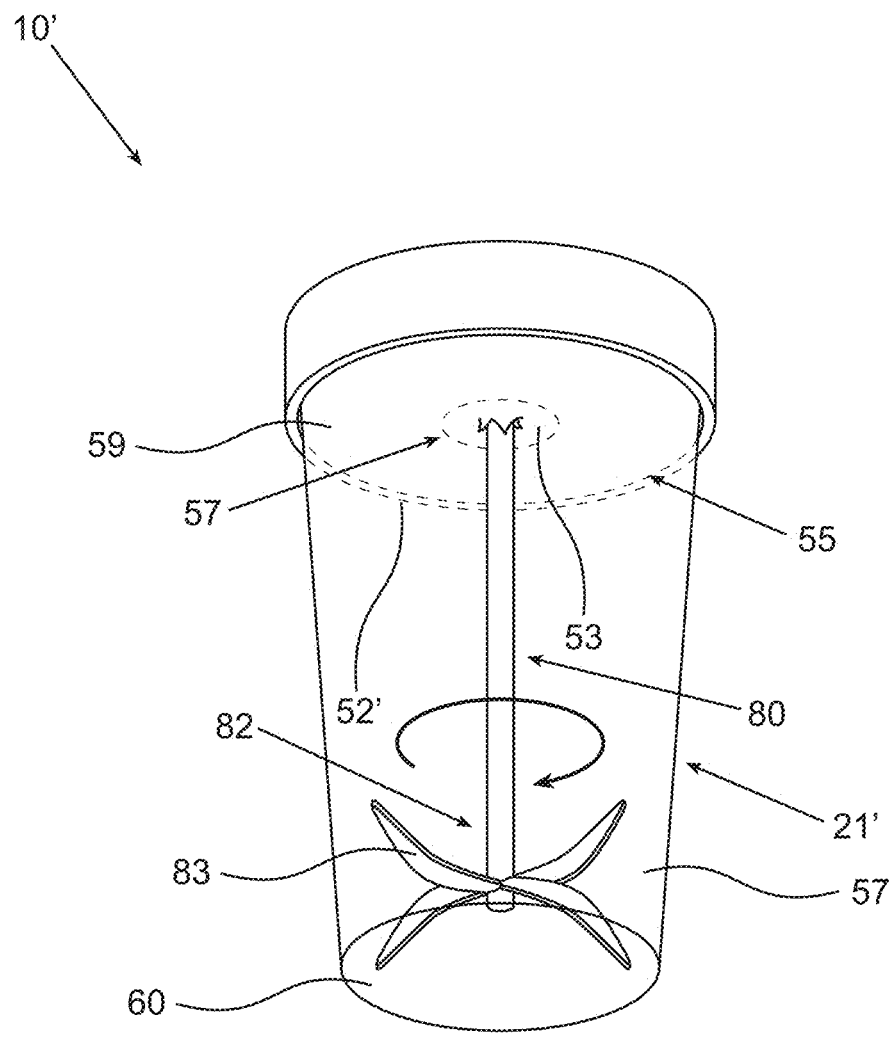
FIG. 6b illustrates the embodiment wherein the stirrer is after insertion.

In some embodiments 10' as shown in FIGS. 6a, 6b the partition 52' is ring-shaped, such that a stirrer 80 e.g., a rod 82 ending with fins 83, may be inserted through a hole 53 in the ring 55 and into the cup 21' to stir the liquid and/or help break up particulate soluble matter in the essence 59. FIG. 6a illustrates the embodiment 10' wherein the stirrer 80 is before insertion and FIG. 6b illustrates the embodiment 10' wherein the stirrer 80 is after insertion. In some embodiments the fins 83 are foldable which allows to minimize the hole 53 and maximize the surface of the partition 52'.

The partition portions 52, 52' and 54 may include a solid edible material which melts or dissolves upon warming to an intermediate melting temperature. Thus, upon heating to an intermediate melting temperature, lower than the desired drinking temperature, the edible material dissolves and the liquid 57 mixes with the essence 59 to provide the desired beverage. An exemplary natural edible material is beeswax, which melts at 62-64° C., and is known to be used in the food industry. An exemplary liquid 57 is water and an exemplary essence 59 is coffee powder or a bunch of coffee grains.

In the example of FIG. 3c, the partition sheets or portions 52 and 54 are perforated by holes 70 blocked by the solid edible material. Such perforation and blocking thereof minimizes the amount of solid edible material such as for example to minimize the content in the beverage which may reduce off-taste and costs. As shown in FIGS. 6a and 6b, in some embodiments having the ring-shaped partition 52', the centre of the ring 55 may be made of the edible meltable material 57 or another edible material, that may be perforated by a stirrer 80 descending into the liquid. As shown in FIG. 6a, the edible material layer 57 in the centre 53 may serve to help keep the liquid sealed in the cup 21 and may be instead of or in addition to a cover above the partition 52'.

At present I believe that the last embodiment operates most efficiently, but other embodiments described herein are also satisfactory.

The thermally conducting bottom 60 may include an aluminum foil. The thermally insulating barrel 62 may include paper, or polystyrene, or wood, or cork, or cellulose, or mixtures thereof.

The thermally conducting bottom 60 and the thermally insulating barrel 62 in some embodiments are glued together such as to withstand the heat exerted upon the disposable cup 21 while warming the liquid 57 to a desired drinking temperature.

Preferably, disposable drinking kit 50 is configured to lack the ability to withstand direct application of pressurized liquid and/or pressurized liquid vapor on the contents of cup 21.

Figure 5A:
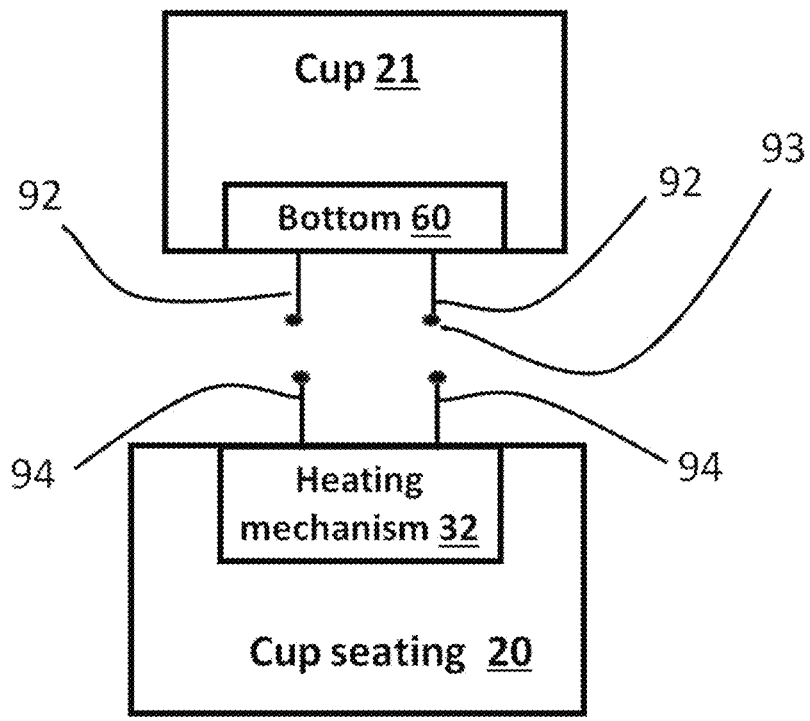
FIG. 5a is a schematic block diagram of a cup seating ready to warm a disposable cup by a resistive circuit which includes the cup bottom.
Figure 5B:
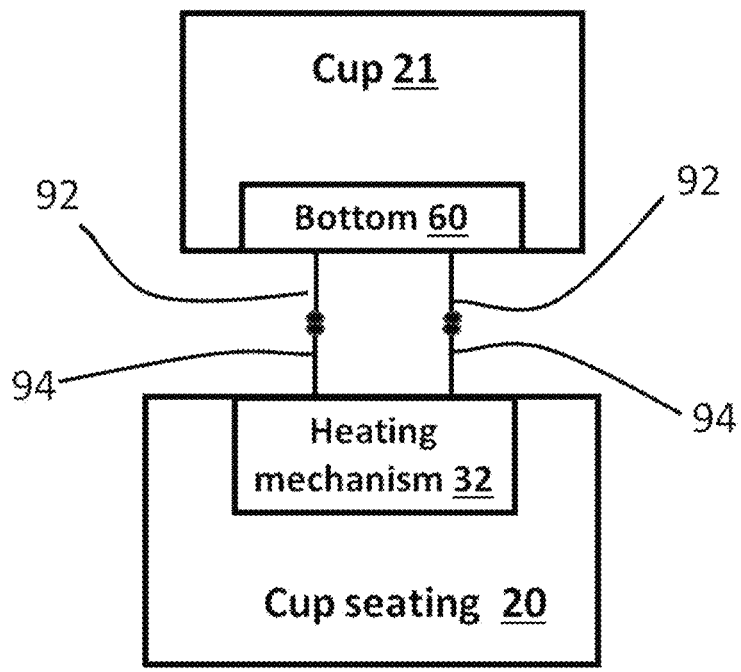
FIG. 5b is a schematic block diagram of the cup seating and the disposable cup of FIG. 5a in operation.

In other embodiments, shown in FIG. 5a and FIG. 5b the thermally conducting bottom 60 is conducting electrically as well. Two electrically conductive elements 92 are connected to the bottom 60 at two distant points, while their terminals 93 are electrically isolated from each other. The cup seating 20 includes two electrically conductive elements 94. Thus, the electrically conducting cup bottom 60 is heated by the two connected electrically conductive elements 92 when they come into electrical contact with the two electrically conductive elements 94.

Figure 4:
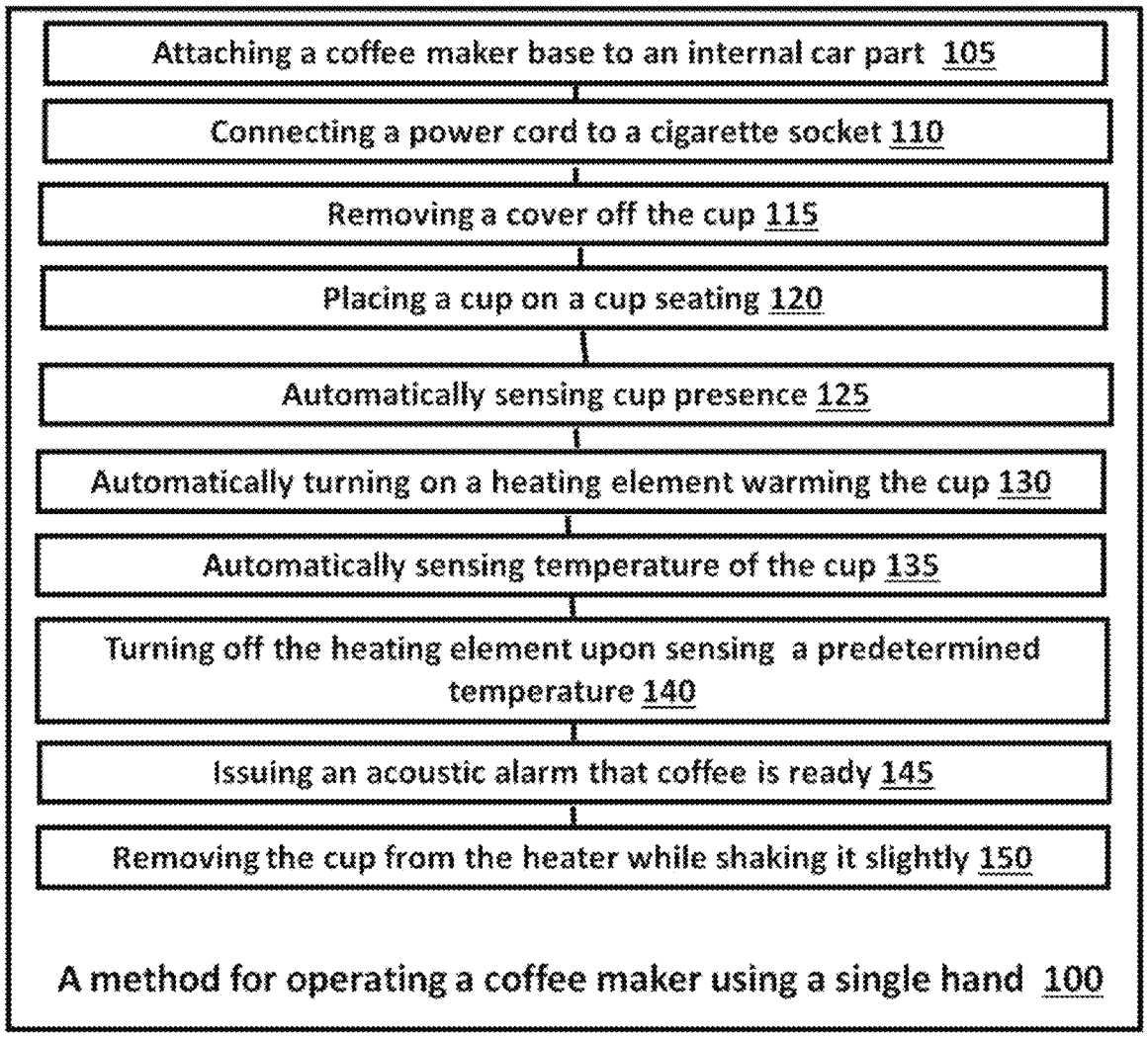
FIG. 4 is a flow chart of a method for operating a beverage maker using a single hand.

A method for operating a beverage maker embodiment (FIG. 4)

The flow chart of FIG. 4 illustrates a method 100 for operating a beverage maker 10 within a vehicle using a single hand. Primary installation of the beverage maker 10 within the vehicle may necessitate use of two hands but once installation is over, the method allows a driver to prepare a beverage while stopping aside for a moment or even while driving in slowly moving traffic. The installation of beverage maker 10 includes a step 105 of attaching the beverage maker 10 to an internal vehicle part 16 and a step 110 of connecting a power cord 22 to a cigarette lighter socket.

Using a single hand, the method 100 includes a step 120 of placing a disposable cup 21 on a cup seating 20 associated with a heating mechanism 32, the placed cup 21 containing a liquid 57 and an essence 59, a step 115 of removing a cover 64 off the cup 21 using a flap 66, and a step 125 of automatically sensing a presence of the placed cup 21 on the cup seating 20. The method 100 further includes a step 130 of automatically turning on the heating mechanism 32 for warming the liquid 57, and a step 135 of automatically sensing a temperature related to the temperature of the liquid 57. The method 100 further includes the step 140 of automatically turning off the heating mechanism upon sensing a desired drinking temperature, a step 145 of automatically issuing an alarm signal that the liquid 57 is at a desired drinking temperature, and a step 150 of removing the placed cup 21 from the seating 20.

The desired drinking temperature is predetermined at a range of 70-90° C., or 60-80° C. As is usual with hot beverages, a desired drinking temperature is a target temperature for the time that making the beverage is over, whereas the actual drinking temperature is determined by a user in accordance with personal preferences.

In some embodiments the placed cup 21 is not removed from the seating 20 until the measured temperature is the actual drinking temperature that is preset by the user or cooler. In some particular embodiments, the cup's liquid is automatically stirred until reaching the preset temperature, both in order to obtain a representative temperature for the cup's liquid contents rather than a local temperature, and in order to help quickly dissipate heat and thus shorten the time until the liquid is ready to be consumed.

In some embodiments, the desired drinking temperature is obtained in less than 4 minutes, preferably in less than 2 minutes.

Preferably, the method 100 includes no step of applying pressurized liquid and/or pressurized liquid vapor on the essence 59. In other words, the method 100 is efficient in preparing certain beverages like coffee, tea, and soup despite applying no pressurized fluid on the essence 59.

The method 100 may include a step 150 of slightly shaking the cup 21 for better mixing of the liquid 57 and the essence 59.

Management of Disposable Cups

Disposable cups may be used in all the above embodiments. The beverage maker embodiment and the method embodiment may use disposable cups having partition as per the above disposable cup embodiment, but may also use cups having no partition.

Individual disposable cups or a kit containing several cups may be purchased in groceries or convenience shops and be stored in a refrigerator for long storage durations, or in the car for use after relatively short storage time, in accordance with the outside temperature.

The invention claimed is:

1. A method for operating a drink maker within a vehicle using a single hand, the method comprising:
   a. providing a stirrer;
   b. placing a cup on a seating associated with a heating mechanism, said placed cup containing a liquid and an essence, wherein the liquid and the essence are separated by a partition having the shape of a ring;
   c. automatically sensing a presence of the placed cup on said seating;
   d, automatically turning on the heating mechanism for warming said liquid;
   e. automatically sensing a temperature relating to the temperature of said liquid;
   f. automatically turning off said heating mechanism upon sensing a first predetermined temperature;
   g. said partition enabling mixing of said liquid and said essence upon warming to a second predetermined temperature, wherein said second predetermined temperature is lower than said first predetermined temperature;
   h. inserting said stirrer through the ring when the liquid is at the second predetermined temperature;
   i. stirring the liquid with said stirrer, and
   j. removing said placed cup from said seating.

2. The method of claim 1 wherein the method applies no pressurized liquid and no pressurized liquid vapor on said essence.

3. The method of claim 1 further comprising a step of operationally associating said drink maker to an electrically powered vehicle part.

4. The method of claim 3 further comprising a step of connecting a power cord to a cigarette socket of the vehicle.

5. The method of claim 1 further comprising a step of connecting a power cord to a cigarette socket of the vehicle.

6. The method of claim 1 further comprising a step of fixedly attaching said drink maker to an internal car part.

7. The method of claim 1 further comprising a step of removing a cover off said placed cup.

8. The method of claim 1 further comprising a step of automatically issuing an alarm that the liquid is at said first predetermined temperature.

9. The method of claim 1 wherein said partition includes a solid edible material which melts or dissolves upon warming to said second predetermined temperature.

10. The method of claim 9 wherein said partition includes at least one sheet perforated by a plurality of holes blocked by said solid edible material.

11. The method of claim 1 wherein the cup includes a thermally conducting bottom, a thermally insulating barrel and a cup cover.

12. The method of claim 11 wherein said thermally conducting bottom includes an aluminum foil.

13. The method of claim 11 wherein said thermally insulating barrel includes a material selected from a list of materials consisting of paper, polystyrene, wood, cork, cellulose, and mixtures thereof.

14. The method of claim 11 wherein a connection between said thermally conducting bottom and said thermally insulating barrel withstands heat exerted on the cup while warming it to the second predetermined temperature.

15. The method of claim 9 wherein said partition is perforated by a plurality of holes blocked by said edible material.

16. The method of claim 1 further comprising:
   A. providing a cup presence sensor and issuing a first signal upon placing said cup on said seating;
   B. providing a cup temperature sensor and issuing a plurality of second signals relating to the temperature of said liquid;
   C. providing an alarm and issuing an alarming signal upon terminating operation of said heating mechanism; and
   D. providing an electrical controller for receiving said first signal, for turning on said heating mechanism, for receiving said plurality of second signals, for terminating heating mechanism operation, and for turning on said alarm.

17. The method of claim 16 comprising sounding an acoustic alarm and/or a flashing alarm.

18. The method of claim 16 further comprising providing means for connection to an electrically powered vehicle part, and a plug-socket interface for matching electrical parameters provided by said electrically powered vehicle part and electrical parameters desired for said heating mechanism.

19. The method of claim 16 wherein said heating mechanism comprises at least two first electrically conductive elements that are electrically isolated from each other, and heating the cup by said at least two first electrically conductive elements upon application of an electrical contact closing a heating electrical circuit.

20. The method of claim 19 wherein said cup comprises at least two second electrically conductive elements, and said seating is configured to receive said cup, and allowing the cup bottom to be heated by said at least two second electrically conductive elements when they come into electrical contact with the at least two first electrically conductive elements.

* * * * *